(12) United States Patent
Franchini

(10) Patent No.: US 7,611,110 B2
(45) Date of Patent: Nov. 3, 2009

(54) CLAMP SUPPORT SYSTEM FOR ELECTRICAL, ELECTRONIC, OPTICAL AND MECHANICAL DEVICES AND COMPONENTS

(75) Inventor: Gian Carlo Franchini, Correggio (RE) (IT)

(73) Assignee: Elesa S.p.A., Milan (IT)

( * ) Notice: Subject to any disclaimer, the term of this patent is extended or adjusted under 35 U.S.C. 154(b) by 0 days.

(21) Appl. No.: 10/950,123

(22) Filed: Sep. 24, 2004

(65) Prior Publication Data
US 2005/0092882 A1 May 5, 2005

(30) Foreign Application Priority Data
Oct. 16, 2003 (IT) .................... MI2003A2012 U

(51) Int. Cl.
*A47B 96/00* (2006.01)
(52) U.S. Cl. .................. 248/227.4; 248/230.1; 403/362
(58) Field of Classification Search ............. 248/276.1, 248/121, 122.1, 124.2, 125.9, 393, 397, 395, 248/218.4, 219.3, 227.4, 230.1, 231.21; 16/426, 16/427, 422, 252, 300, 338, 344, 375; 403/373, 403/395, 191, 196, 234, 235, 236, 290, 362, 403/388, 398
See application file for complete search history.

(56) References Cited

U.S. PATENT DOCUMENTS

| | | | |
|---|---|---|---|
| 135,924 A | 2/1873 | Lyon | |
| 2,869,901 A | 7/1959 | Levy et al. | |
| 3,167,292 A * | 1/1965 | Meyerowitz | 248/230.1 |
| 3,464,055 A * | 8/1969 | Lescarboura | 439/733.1 |
| 3,707,698 A * | 12/1972 | Robinson et al. | 439/431 |
| 3,722,930 A * | 3/1973 | Humlong | 403/395 |
| 4,056,252 A * | 11/1977 | Simon | 248/56 |
| 4,162,819 A * | 7/1979 | Eisert | 439/711 |
| 4,693,542 A * | 9/1987 | Heng et al. | 439/626 |
| 5,615,854 A | 4/1997 | Nomura et al. | |
| 5,907,883 A * | 6/1999 | Thomasson | 15/120.2 |
| 6,349,905 B1 | 2/2002 | Mills | |
| 6,390,424 B1 | 5/2002 | Kidushim et al. | |
| 6,619,872 B2 * | 9/2003 | Crorey et al. | 403/97 |
| 6,625,837 B2 * | 9/2003 | Jiang | 15/105 |

\* cited by examiner

*Primary Examiner*—A. Joseph Wujciak, III
(74) *Attorney, Agent, or Firm*—Pearne & Gordon LLP

(57) ABSTRACT

A clamp support system including a basic support made of a plastic material, a device support made of a plastic material, and a section bar connecting the basic support and the device support. A seat that houses a portion of the section bar is provided to each of the basic support and the device support. Each seat is bounded by walls that are deformable in at least an area. A fastening means that acts on the deformable area for locking the section bar is provided to each support. The section bars and the corresponding seats have matching grooved surfaces. The basic support includes a generally U-shaped body having a central opening that houses a wheel in which the seat of the basic support is provided. The wheel has front toothings for cooperating with a protruding rib of the body for the locking of the wheel via the fastening means.

21 Claims, 3 Drawing Sheets

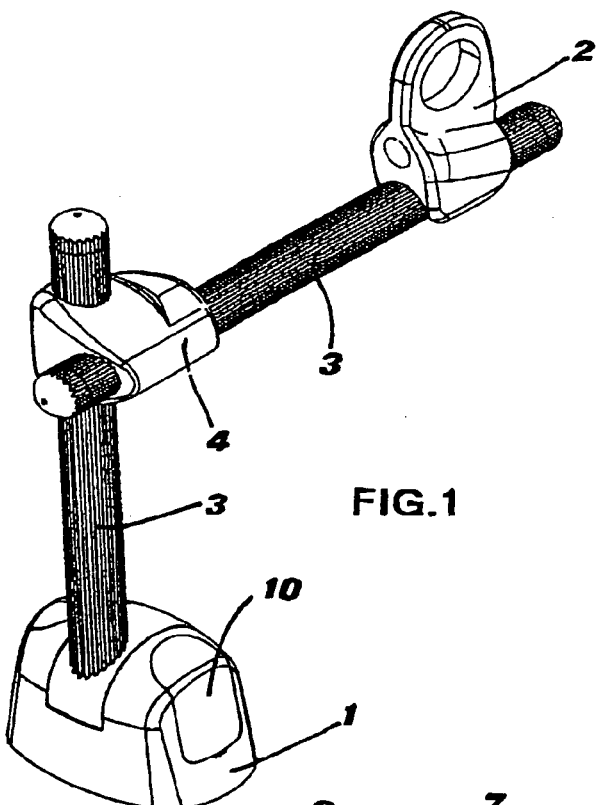
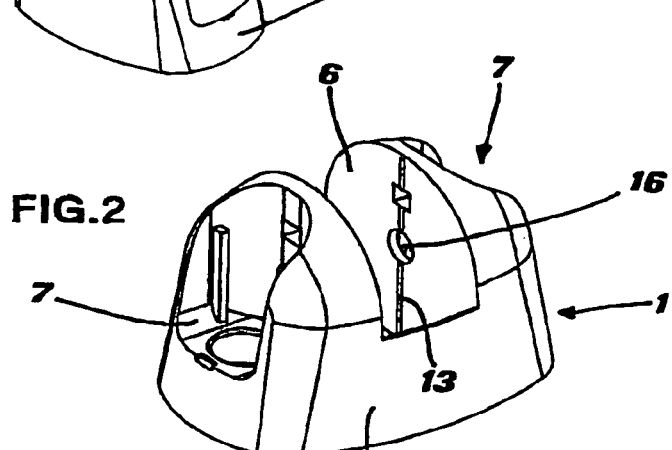
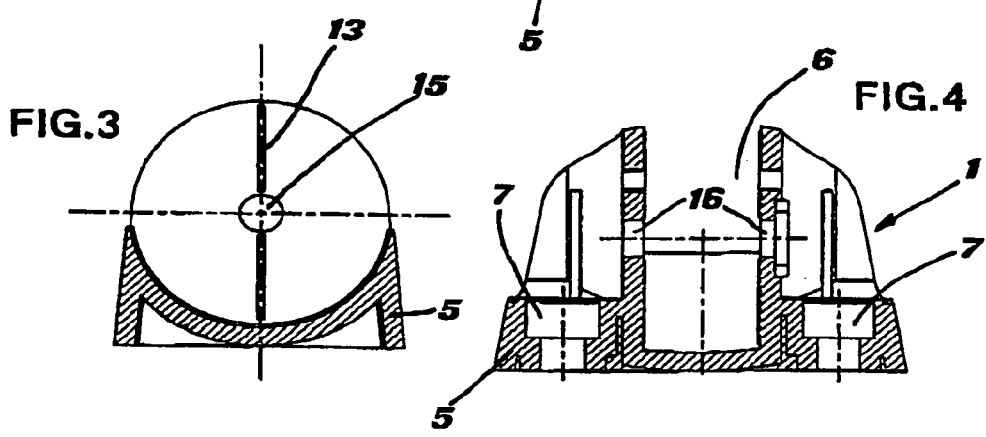
FIG.1
FIG.2
FIG.3
FIG.4

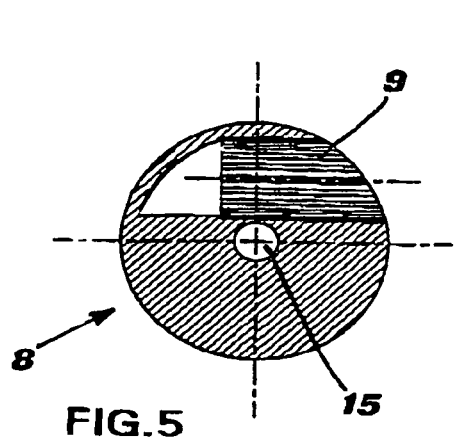
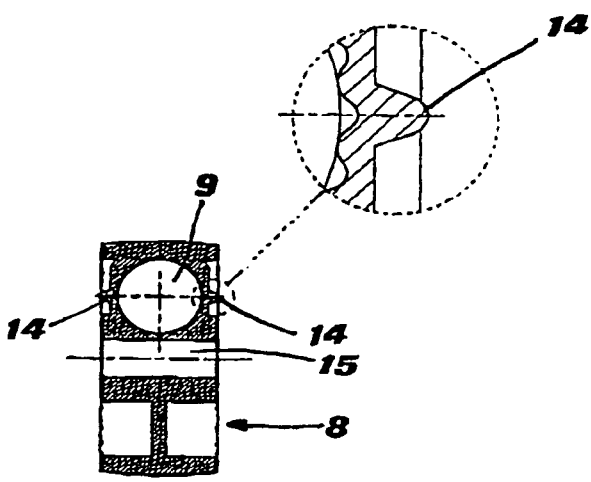
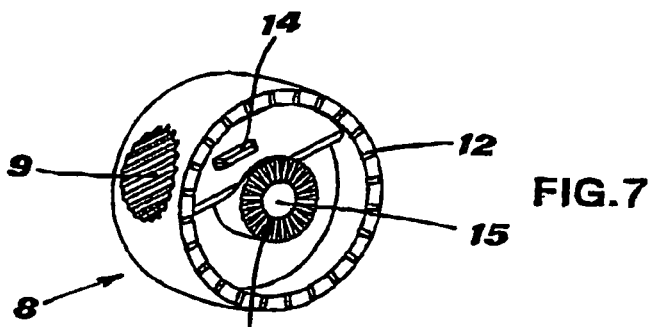
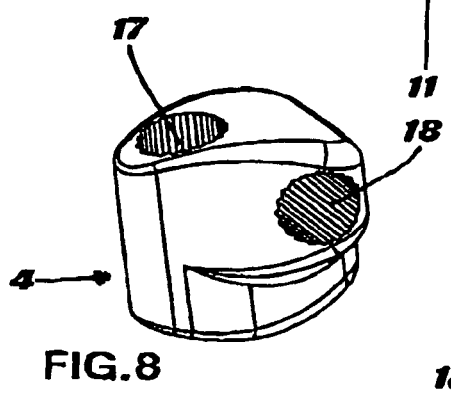
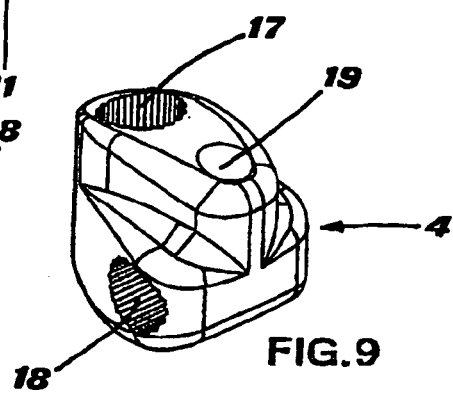
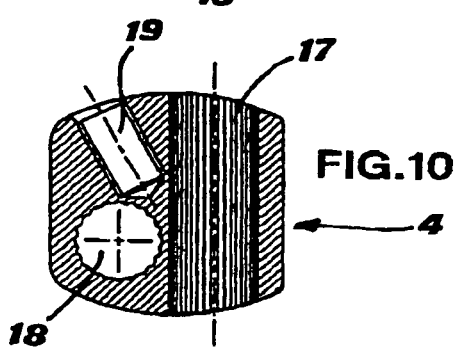

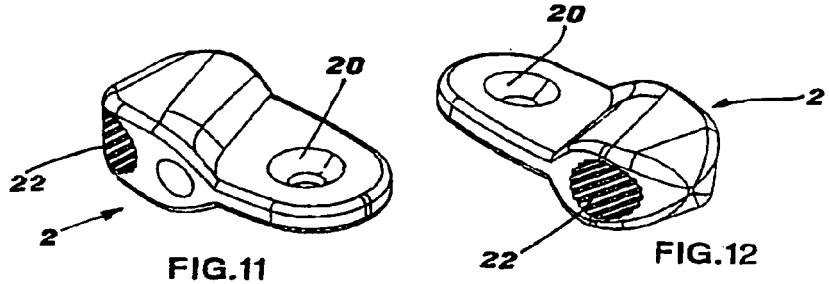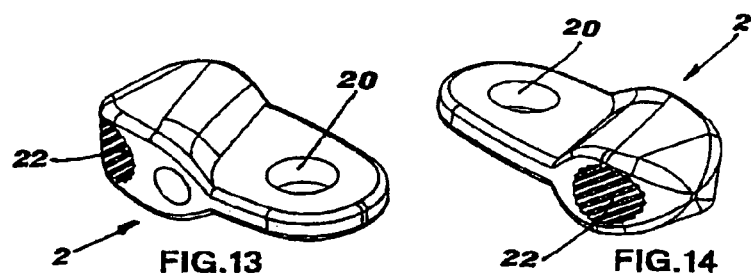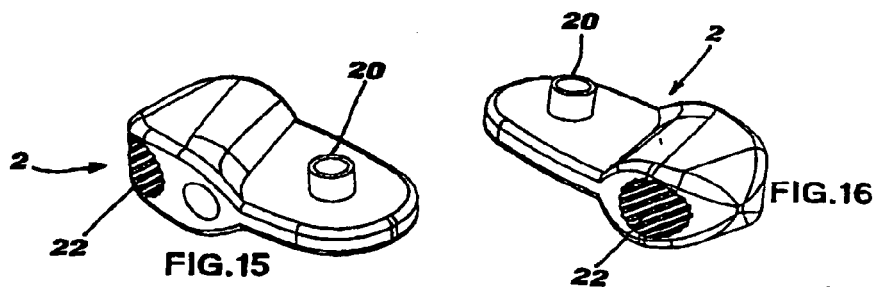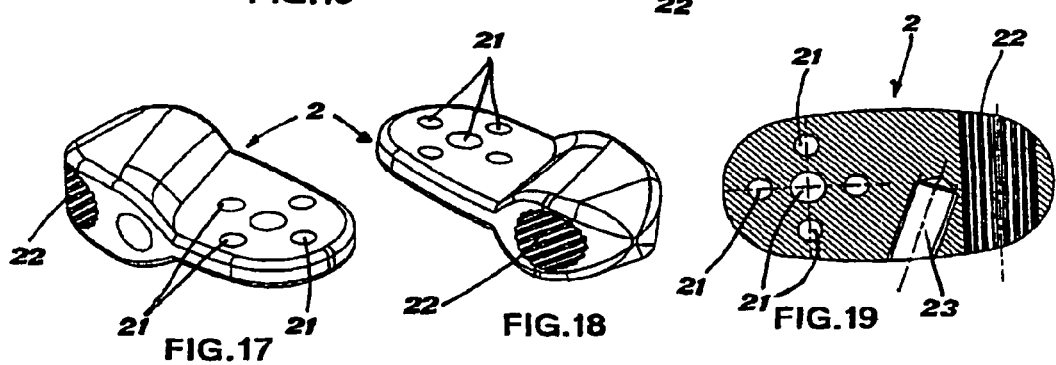

CLAMP SUPPORT SYSTEM FOR ELECTRICAL, ELECTRONIC, OPTICAL AND MECHANICAL DEVICES AND COMPONENTS

BACKGROUND OF THE INVENTION

The present invention relates to a support system for electrical, electronic, optical and mechanical devices and components using clamps formed by connecting elements.

BRIEF SUMMARY OF THE INVENTION

The present invention provides a clamp support system comprising a basic support comprising a plastic material, a device support comprising a plastic material, and a section bar connecting the basic support and the device support. A seat that houses a portion of the section bar is provided to each of the basic support and the device support. Each seat is bounded by walls that are deformable in at least an area.

A fastening means is provided to each of the basic support and the device support. Each fastening means acts on the deformable area for locking the section bar. The section bars and the corresponding seats have matching grooved surfaces.

The basic support comprises a generally U-shaped body having a central opening that houses a wheel in which the seat of the basic support is provided. The wheel has front toothings for cooperating with at least one protruding rib of the generally U-shaped body for the locking of the wheel via the fastening means.

BRIEF DESCRIPTION OF THE DRAWINGS

The invention will now be described in greater detail in the following, with reference to the accompanying drawings, which represent a currently preferred embodiment thereof and in which:

FIG. 1 is an overall perspective view of a support system according to the present invention, suitable for example for photocells;

FIG. 2 is a perspective view of the U-shaped body of a basic support of the support system of FIG. 1;

FIG. 3 is cross section of the basic support of FIG. 1;

FIG. 4 is a longitudinal section of the basic support of FIG. 1;

FIG. 5 is a cross section of a wheel having front toothings to be mounted in the U-shaped body of FIG. 2;

FIG. 6 is an axial section of the wheel of FIG. 5;

FIG. 7 is a perspective view of the wheel of FIG. 5;

FIG. 8 is a perspective view of a 90° connection for the support system of FIG. 1;

FIG. 9 is a further perspective view of the 90° connection of FIG. 8;

FIG. 10 is a section view of the 90° connection of FIG. 8;

FIG. 11 is a perspective view of a device support according to an second embodiment of the present invention;

FIG. 12 is a further perspective view of the device support of FIG. 11;

FIG. 13 is a perspective view of a device support according to a third embodiment of the present invention;

FIG. 14 is a further perspective view of the device support of FIG. 13;

FIG. 15 is a perspective view of a device support according to a fourth embodiment of the present invention;

FIG. 16 is a further perspective view of the device support of FIG. 15;

FIG. 17 is a perspective view of a device support according to a fifth embodiment of the present invention;

FIG. 18 is a further perspective view of the device support of FIG. 17; and FIG. 19 is a section view of the device support of FIGS. 17 and 18.

DETAILED DESCRIPTION OF THE INVENTION

With reference to FIGS. 1-10, the clamp support system according a first embodiment of the present invention consists of few low-cost and easy-to-connect elements, such as a basic support 1, a device support 2, one or more section bars 3 connecting said supports 1, 2 and optionally one or more connections 4 between said section bars 3. The example embodiment of FIG. 1 includes two section bars 3 connected by one connection 4. Said system is suited to support, on the device support 2 thereof, various commercially available devices including, for example, photocells, sensors, light sources, reflectors, and generally a wide variety of mechanical, optical, electrical and electronic components.

According to a main feature of the invention, the supports 1, 2 and the connections 4 are made of plastic material. The junctions of the supports 1, 2 and the connections 4 to the section bars 3 are stabilized by fastening means operating as clamps by deforming areas next to the seats of the section bars 3 of the supports 1,2 and the connections 4.

More particularly, the seats that accommodate said section bars (3) are bounded by walls which are deformable, at least in a partial area. The fastening means associated with said supports 1, 2 and connections 4 act on said deformable partial areas, in order to lock the ends of the section bars into the seats.

As far as the section bars 3 are concerned, they can be made of metal, such as light alloys, or plastic material.

FIGS. 2 to 7 illustrate the present embodiment of the basic support 1 of the clamp system according to the present invention. The basic support 1 comprises a U-shaped body 5 having a central opening 6 and two side apertures 7. A wheel 8, in which a seat 9 for a section bar 3 is provided, is to be arranged inside said central opening 6 of the body 5 in an adjustable position about the axis of said wheel. A nut-screw pair or a bolt (not shown) is provided to engage the holes 16 of the walls of the central opening 6, functioning both as a pivot pin for the wheel 8 and as a stay for locking the position of said wheel. Screws (not shown) are inserted into said apertures 7, attaching the body 5, and hence the basic support 1 and the entire system, onto a supporting structure, for example, a wall.

According to the present invention, the wheel 8 has front toothings 11, 12, with which can engage a protrusion 13 of at least one of the inner walls of the central opening 6 of the body 1. The wheel position can be adjusted by rotating said wheel, thereby orienting the seat 9 and the section bar 3 in a desired position, and consequently locking the wheel in the adjusted position.

The wheel 8 is arranged inside the central opening 6 of the body 5, which is shaped to match the shape of the wheel 8, as can be seen in the drawings. A central hole 15 of the wheel 8 corresponds to holes 16 in the walls of the central opening 6. Once the seat 9 is mounted in the central opening 6 and a bolt pin has been passed through the holes 15, 16, the wheel can be rotated in order to orient the seat 9 of the section bar 3 in the desired position. Thereafter, the wheel is locked by tightening the bolt (or of the nut-screw pair) in the holes 15, 16. By doing this, the two walls of the opening 6 are drawn toward one another and the protrusion 13 engages the toothings 11, 12, thereby preventing the possible rotation of the wheel 8, the position of which is thus locked.

According to another feature of the present invention, additional protrusions 14 are provided on the wheel 8 in an area corresponding to the seat 9. The additional protrusions 14 project beyond the outer surface of the wheel 8. In said area, the wall of the seat 9 is thin enough to be elastically yielding. The protrusions 14, pushed by the side walls of the opening 6 (FIG. 6) bending inwards and deforming the seat 9 to prevent rotation and axial shifts of a section bar 3 inserted therein. As a result, when the section bar 3 is inserted into the seat 9, the section bar is also locked in the position it was in before the bolt was tightened.

The above described locking effect is aided by grooves on the outer wall of section bar 3 and on the inner wall of the seat 9, as shown by the drawings. As suitable, these grooved walls can be provided as longitudinal ribs and/or grooves with well-connected radiuses to avoid dirt deposits and to ease cleaning operations. The ribs and grooves oppose any rotation of the section bars 3 in the seats 9 of the wheel 8.

With the system according to the present invention it is possible to carry out adjustments of the wheel 8 in the body 5, subsequently locking the section bar, with preset angles in respect of the constraint plane, such as between −15.degree. and +120.degree. Once the desired adjustment has been carried out, the covers 10 protecting the apertures 7 and providing an improved outer appearance of the support 1 can be applied.

FIGS. 8 to 10 illustrate a 90° connection of the system according to the present invention. This connection is a plastic body 4 in which two seats 17, 18 are provided, whose axes are at 90° to each other. Each of these seats 17, 18 is intended for a corresponding section bar 3 of the abovementioned type. As with the basic support 1, the connection has been provided with grooved-surface seats.

As shown in FIG. 10, a hole 19 is drilled in the body 4 in an intermediate position between the seats 17, 18, which are perpendicular to each other. The axis of the hole 19 is oblique in respect to the axes of the seats 17, 18. Hole 19 is a blind bore that extends into the body 4 to the point where the bottom of the hole 19 is adjacent the walls of said seats 17, 18. In this way at least one area of the walls is thin enough to be elastically yielding. As a consequence, it is possible, once the section bars 3 have been inserted in the desired position in the seats 17, 18, to lock said section bars in said position using a single screw (not shown) inserted in the sloping hole 19. By fully tightening this fastening means, in fact, areas of the walls of the seats are deformed and the section bars 3 are locked, thereby preventing rotation and axial shifts thereof.

Finally, FIGS. 11-19 represent some additional types of device supports 2 for supporting different devices with the system according to the present invention. Four different supports 2 with an individual mounting connection 20 or with multiple mounting connections 21 meant to receive and/or fix various types of devices have been illustrated, each in two perspective views.

In particular, a support according to a second embodiment of the present invention, as illustrated in FIGS. 11 and 12, has a mounting connection 20 in the shape of a countersunk hole. A support according to a third embodiment of the present invention, as illustrated in FIGS. 13 and 14, has a cylindrical-wall hole for mounting connection 20. A support according to a fourth embodiment of the present invention, as illustrated in FIGS. 15 and 16 has a hole for mounting connection 20 with a bushing guide. A support according to a fifth embodiment of the present invention, as illustrated in FIGS. 17, 18 and 19 has several holes for mounting connections 21 arranged in the shape of a cross. In each of these supports 2, shown in FIGS. 11-19, a grooved seat 22 is provided for the section bar 3 to which the support 2 is attached.

From FIG. 19, which is a section view of the support 2 of FIGS. 17 and 18 with multiple mounting connections 21, it can be easily seen how locking of the support 2 on the section bar 3 is accomplished. The device support 2 is locked in the same manner as with the connection 4 of FIG. 10, by screwing on a screw (not shown) within a suitable threaded hole 23 arranged in the proximity of the seat 22, and sloping in respect thereof in order to better guarantee deformation thereof, through which deformation said locking on said section bar 3 is achieved.

The system of the present invention allows for tilts offset from 90° (and varying within a wide angle range) in respect to the constraint plane of the basic support. Moreover, the use of grooved-surface section bars, while preventing rotations, even under stress, of the section bars themselves in the support and connection seats, as well as axial shifts in respect thereto, provides accurate and easy-to-verify alignments.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A clamp support system for clamping devices and components, comprising:
   a basic support (1) comprising a plastic material;
   a device support (2) comprising a plastic material;
   a section bar (3) connecting the basic support (1) and the device support (2); and
   a seat (22) that houses a portion of the section bar (3), wherein the seat is located in the device support;
   the seat (22) being bounded by a circumferentially-continuous wall and wherein the wall is in between the device support and seat;
   the device support (2) having a hole (23) with side walls and bottom located proximate the wall of the seat (22), the hole (23) being adapted to receive a fastening element, insertion of the fastening element into the hole (23) causing the bottom of the hole (23) to deform a portion of the wall against the surface of the section bar (3) for locking the section bar (3) relative to the device support (2).

2. The clamp support system of claim 1, further comprising:
   a second section bar (3);
   a connection (4) comprising a plastic material is provided between the section bar (3) and the second section bar (3), the connection (4) being provided with a first seat (17) that houses the section bar (3) and a second seat (18) that houses the second section bar (3), the first seat (17) being bounded by a first wall and the second seat (18) being bounded by a second wall.

3. The clamp support system of claim 1, wherein the portion of the wall of the seat (22) that is deformed is elastically deformable.

4. The clamp support system of claim 1, wherein the section bar (3) comprises metal.

5. The clamp support system of claim 1, wherein the section bar (3) comprises plastic material.

6. The clamp support system of claim 1, wherein the hole (23) is a blind bore.

7. The clamp support system of claim 1, wherein the fastening element includes an end adapted to act upon the bottom of the hole (23) to deform the portion of the wall against the surface of the section bar (3).

8. A clamp support system for clamping devices and components, comprising:
- a basic support (1) comprising a plastic material and having a generally U-shaped body (5) having a central opening (6) housing a wheel (8);
- a device support (2) comprising a plastic material;
- a section bar (3) connecting the wheel (8) and the device support (2); and
- a seat (9) that houses a portion of the section bar (3) located in the wheel (8), the seat (9) being bounded by a circumferentially-continuous wall;
- wherein the wheel (8) is provided with a protrusion (14) extending beyond an outer front surface of the wheel (8) and located proximate the wall of the seat (9), engagement of the protrusion (14) with a portion of the central opening (6) causing the protrusion (14) to deform a portion of the wall against the surface of the section bar (3) for locking the section bar (3) relative to the wheel (8).

9. The clamp support system of claim 8, wherein the wheel (8) has front toothings (11, 12) for cooperating with at least one protruding rib (13) of the generally U-shaped body (5) for locking the wheel (8) relative to the U-shaped body (5).

10. The clamp support system of claim 9, wherein a bolt passes through the wheel (8) along the axis of rotation, and wherein tightening the bolt deforms the generally U-shaped body (5) of the support (1) to lock the wheel (8) in an adjusted position via the cooperation between the front toothings (11, 12) and the protruding rib (13).

11. The clamp support system of claim 8, wherein the wheel (8) is rotatably mounted having an axis of rotation crossing the basic support (1) for orienting the wheel (8) in an adjusted position and securing the wheel (8) in the adjusted position relative to the U-shaped body (5).

12. A clamp support system for clamping devices and components, comprising:
- a basic support (1) comprising a plastic material;
- a device support (2) comprising a plastic material;
- a section bar (3) connecting the basic support (1) and the device support (2); and
- a seat (22) that houses a portion of the section bar (3) located in the device support (2), the seat (22) being bounded by a wall and wherein the wall is in between the seat and device support;
- the device support (2) having a hole (23) with side walls and a bottom located proximate the wall of the seat (22), the hole (23) being adapted to receive a fastening element, insertion of the fastening element into the hole (23) causing the bottom wall of the hole (23) to deform a portion of the wall against the surface of the section bar (3) for locking the section bar (3) relative to the device support (2);
- a second section bar (3); and
- a connection (4) comprising a plastic material is provided between the section bar (3) and the second section bar (3), the connection (4) being provided with a first seat (17) that houses the section bar (3) and a second seat (18) that houses the second section bar (3), the first seat (17) being bounded by a first wall and the second seat (18) being bounded by a second wall.

13. The claim support system of claim 12, wherein the connection (4) has a hole (19) with a bottom located proximate both of the first wall and the second wall, the hole (19) being adapted to receive a fastening element, insertion of the fastening element into the hole (19) causing the bottom of the bore to simultaneously deform a portion of the first wall against the surface of the first section bar (3) and a portion of the second wall against the surface of the second section bar (3) for locking both of the first and second section bars (3) relative to the connection (4).

14. The clamp support system of claim 13, wherein the portion of the walls of each of the seats (17, 18, 22) that is deformed corresponds to the hole (19, 23) drilled in one of the corresponding device support (2), and the connection (4).

15. The clamp support system of claim 13, wherein each hole (19, 23) is oblique with respect to an axis of the corresponding seat.

16. The clamp support system of claim 13, wherein each hole (19, 23) is threaded and the fastening element is a screw or a bolt.

17. The clamp support system of claim 16, wherein a single fastening screw or a single fastening bolt is provided for each of the basic support (1), the device support (2), and the connection (4).

18. The clamp support system of claim 13, wherein each of the section bars (3) and the corresponding seats (9, 17, 18, 22) have matching grooved surfaces.

19. The clamp support system of claim 13, wherein the hole (19) is a blind bore.

20. A clamp support system comprising:
- a basic support (1) comprising a plastic material;
- a device support (2) comprising a plastic material;
- a section bar (3) connecting the basic support (1) and the device support (2); and
- a seat (22) that houses a portion of the section bar (3) located in the device support (2), the seat (22) being bounded by a wall and wherein the wall is in between the seat and device support;
- the device support (2) having a hole (23) with side walls and a bottom wall located proximate the wall of the seat (22), the hole (23) being adapted to receive a fastening element, insertion of the fastening element into the hole (23) causing the bottom wall of the hole (23) to deform a portion of the wall against the surface of the section bar (3) for locking the section bar (3) relative to the device support (2); and
- wherein the hole (23) is a blind bore.

21. A clamp support system for clamping devices and components, comprising:
- a basic support (1) comprising a plastic material;
- a device support (2) comprising a plastic material;
- a section bar (3) connecting the basic support (1) and the device support (2); and
- a first seat (9) located to the basic support (1) and a second seat (22) located in the device support (2), each seat (9, 22) housing a portion of the section bar (3), each seat (9, 22) being bound by a circumferentially-continuous wall and wherein each wall is in between seat and support;
- the wall of each seat (9, 22) comprising at least a deformable, partial area, thin enough to be elastically yielding;
- fastening elements provided to both the basic support (1) and the device support (2), each fastening element causing, respectively, said partial area of the wall to deform against a surface of the section bar (3) for locking the section bar (3) relative to the basic support (1) and the device support (2) wherein the device support (2) has a hole (23) with a bottom wall thereof located proximate to said deformable partial area of the wall of the second seat (22), the hole (23) being adapted to receive the fastening element, the insertion of the fastening element into the hole (23) causing the bottom wall of the hole (23) to deform said partial area of the wall against the surface of the section bar (3) for locking the section bar (3) relative to the basic support (1) and/or the device support (2).

* * * * *